US006937596B2

(12) United States Patent
Sjölund et al.

(10) Patent No.: US 6,937,596 B2
(45) Date of Patent: Aug. 30, 2005

(54) IP BASED TELEPHONE SYSTEM

(75) Inventors: Jan Sjölund, Saltsjo-Boo (SE); Ros-Marie Furtenback, Johanneshov (SE); Jan Gjärdman, Farsta (SE); Tomas Nylander, Stavsnas (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/742,708

(22) Filed: Dec. 19, 2003

(65) Prior Publication Data

US 2004/0131053 A1 Jul. 8, 2004

Related U.S. Application Data

(63) Continuation of application No. 09/366,684, filed on Aug. 4, 1999, now abandoned.

(51) Int. Cl.[7] .......... H04L 12/66

(52) U.S. Cl. .......... 370/352; 376/401

(58) Field of Search .......... 370/352, 353, 370/354, 355, 356, 401, 465, 466, 467

(56) References Cited

U.S. PATENT DOCUMENTS

| | | | | |
|---|---|---|---|---|
| 6,069,890 A | * | 5/2000 | White et al. | 370/352 |
| 6,157,636 A | * | 12/2000 | Voit et al. | 370/353 |
| 6,222,843 B1 | * | 4/2001 | Mauger | 370/397 |
| 6,490,274 B1 | * | 12/2002 | Kim | 370/352 |
| 6,584,094 B2 | * | 6/2003 | Maroulis et al. | 370/352 |

FOREIGN PATENT DOCUMENTS

| | | |
|---|---|---|
| GB | 2331197 A | 5/1999 |
| WO | WO 97/33412 A1 | 9/1997 |
| WO | WO 98/44713 A1 | 10/1998 |
| WO | WO 98/59469 A2 | 12/1998 |
| WO | WO 99/13635 A1 | 3/1999 |

* cited by examiner

*Primary Examiner*—Kwang Bin Yao

(57) ABSTRACT

A hybrid arrangement allows an existing circuit switched telephony network to be deployed on a packet switched network. The circuit switched underlying transport network is replaced with that of an IP based package switched network, while the circuit switched infrastructure, such as terminals, telephone exchanges and the like are retained. Both a subscriber and a local telephone exchange are connected to, and separated by, an IP based packet switched network, such as the Internet. Signalling between the subscriber and exchange are effected using a standard user to network protocol, such as V5.1 for PSTN and ISDN BRI or DSS1 for ISDN PRI. This standard user network is overlaid on an IP based network protocol, such as TCP or UDP on IP.

8 Claims, 4 Drawing Sheets

IP BASED TELEPHONE SYSTEM

RELATED APPLICATIONS

This application is a continuation of Ser. No. 09/366,684 filed on Aug. 4, 1999, now abandoned, which is incorporated herein in its entirety by reference.

The invention is directed to telephony systems. The invention is of particular relevance to telephony systems in which telephone traffic is transmitted at least in part over an IP based network such as a computer network or the Internet.

BACKGROUND

The advantages of transmitting voice information over a packet or cell switched network has long been recognised. The relative low cost of utilising packet switched networks such as the internet in place of a circuit switched network has generated growing interest and many telecom operators now claim that packet switching surpasses circuit-switched voice transmission in terms of bandwidth usage in their networks. This is due in part to the increase in products that provide voice over IP functions. However, it is also becoming increasingly interesting for network operators to enable telephone calls originating in a standard circuit switched network to be routed at least in part via a packet switched network without altering the way in which a user utilises a telephone or other telephony equipment.

An example of such an arrangement is described in British patent application No. GB 2 331 197. In this known arrangement, a circuit switched trunk network is replaced by a packet switched IP network. This has the advantage of allowing the telecom operator to keep the cost of trunk calls down while still utilising the regular circuit switched systems.

However, as packet switched technology gains importance compared to circuit switching, there is a need to incorporate more of the advantages of packet switched functions into a telecommunications system. Yet, if telecom operators are to continue receiving returns on the substantial investment represented by a circuit switched infrastructure, there is similarly a need to retain as much as possible of the circuit switched system

SUMMARY

The invention provides a hybrid arrangement which allows an existing circuit switched telephony network to be deployed on a packet switched network. Essentially, the circuit switched underlying transport network is replaced with that of an IP based package switched network, while the circuit switched infrastructure, such as terminals, telephone exchanges and the like are retained with modifications. In preferred embodiments of the invention, both a subscriber and a local telephone exchange are connected to, and separated by, a computer network. Signalling between the subscriber and exchange are effected using a standard user to network protocol, such as V5.1 for PSTN and ISDN basic rate interface (BRI) or DSS1 for ISDN primary rate interface (PRI). This standard user to network protocol is overlaid on an IP based network protocol, such as TCP or UDP. By utilising protocols that are conventionally utilised by the counterpart circuit switched system elements the transition from circuit switched to IP-based packet switched network transport can be achieved in a fast and secure fashion since the network elements will be interchangeable with various vendors equipment. Furthermore, the existing services supported by the standard protocols will be supported in the packet switched network.

Moreover, the connection of the subscriber, or the access node to which a subscriber is coupled, to the IP-based network enables the full future exploitation IP-based network without extensive modification of the system.

BRIEF DESCRIPTION OF THE DRAWINGS

Further objects and advantages of the present invention will become apparent from the following description of the preferred embodiments that are given by way of example with reference to the accompanying drawings, in which.

DETAILED DESCRIPTION

Figure 1:
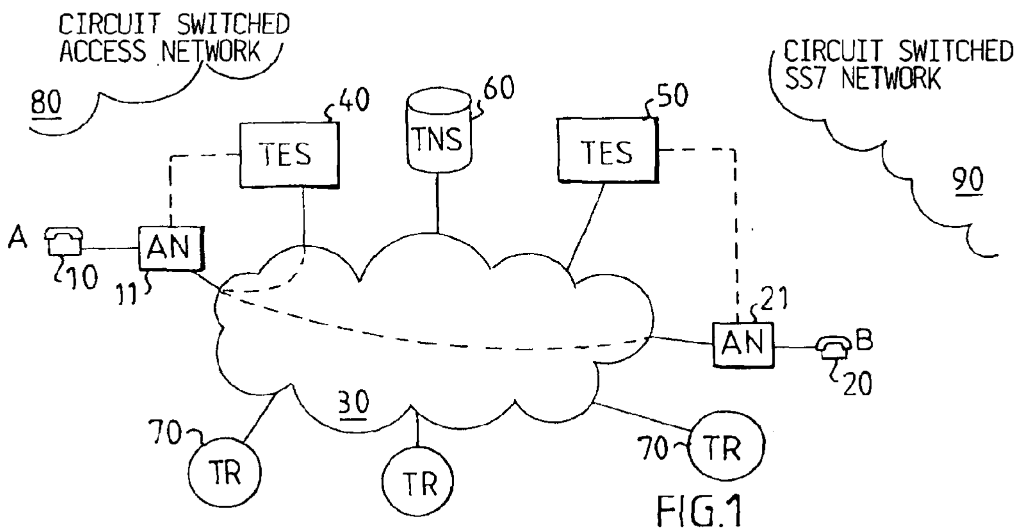
FIG. 1 schematically depicts a telecommunications network according to the present invention.

FIG. 1 illustrates a hybrid network according to the present invention wherein a call is ongoing between an A-subscriber 10, represented by the telephone A on the left-hand side of the figure, and a B-subscriber 20 shown on the right-hand side of the figure. The subscribers are respectively connected to an access node 11, 21, and these access nodes 11, 21 are in turn connected to a computer or similar IP-based packet switched network 30, which is typically the Internet. Also connected to the computer network 30 are a telephony server 40, which is the host server for subscriber A 10 and controls the establishment of calls to and from subscriber A 10, and a similar host telephony server 50 for subscriber B 20. The telephony servers 40, 50 are AXE exchanges with modifications as described below with reference to FIG. 2. They perform the equivalent role of a local exchange or end office in a standard circuit switched telephony system with the significant different that they utilise the IP-based packet switched network as a switch. Each telephony server 40, 50 is also capable of handling circuit switched calls and thus interworking with a traditional circuit switched network, as is illustrated by the illustrated interface in telephony server 40 to a circuit switched access network 80 and the interface in telephony server 50 to a circuit switched SS7 network 90.

A telephony number server 60 is also connected to the computer network 30. The telephony number server 60 is essentially a data base containing lookup tables for converting the telephone number identifying a subscriber to an IP address or addresses of the host telephony server 40, 50 for the subscriber, at which the call will be terminated. It is implemented on a standard UNIX DNS server with BIND software using standard DNS record types, which translate e.164 numbers to IP addresses of the telephony server endpoints of the network. Hence the input to the lookup table is an e.164 destination (B-number) or part of this number. The output would be an IP address or addresses indicating the host telephony server for the subscriber in question.

The telephony number server 60 holds addresses only for those subscribers connected to its own network 30. The IP addresses are defined in advanced and each subscriber, or each physical access to the IP network, is assigned an address. The IP address preferably identifies a UDP port, which could be a fixed relationship with a timeslot that is utilised. For some UDP ports the routing information included in an IP package may include the UDP port and the IP address within the port.

A number of telephony resource devices 70 are also connected to the computer network at various locations. These are the general telephony resources utilised by a telephony server 40, 50 for the support of a call. Typical resources include, but are not limited to, answering machines, conference call devices, tone senders/receivers, tone detectors, voice mail systems and echo cancellers. It is preferable that these resources be centrally located in the computer network 30 rather than associated with a telephony server. This would substantially increase their level of utilisation and render them more cost effective. However, since telephony resources of the kind mentioned above are already available in a conventional AXE exchange these resources are retained in the telephony server 40 in preferred embodiment shown in FIG. 1.

Figure 2:
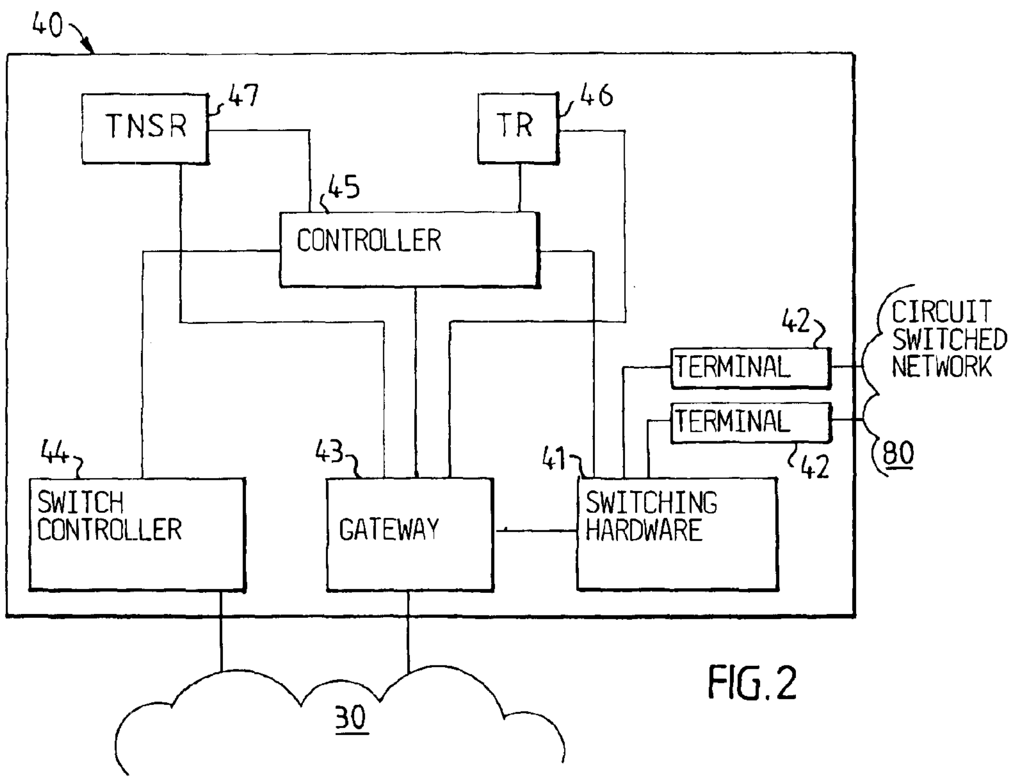
FIG. 2 illustrates the arrangement of a telephony server.

FIG. 2 is a schematic representation of a telephony server 40. The elements of the telephony server 40 include conventional switching hardware 41 for assuring circuit switched connections in the connected circuit switched network. A number of terminals 42 are connected to the switching hardware, and typically include a T1 transmission service terminal and an E1 transmission service terminal. Each terminal is connected to an associated circuit switched network, represented in FIG. 2 by the network 80. The switching hardware 41 is further connected to a gateway 43 which incorporates a PCM to IP adapter for converting a PCM encoded 64 kbps channel to IP packets for transmission over the IP-based network and vice versa. The PCM to IP converter 43 packs the 64 kbps bit stream destined to be transmitted over the computer network 30 into IP compatible packets or datagrams, and similarly unpacks packets arriving at the telephony server 40. An IP switch controller 44 is further provided for assuring the virtual switch formed by the computer network 30 for calls that utilise the computer network. The IP switch controller 44 essentially has a logical view of the IP network 30 as a giant switch with the ingress and egress points to the switch being the various media gateways from the telephony server 40, such as the gateway 43, and the subscriber access nodes 11, 12. The IP switch controller needs to access hardware to enable it to communicate with and control the various media gateways, however, it need not incorporate hardware itself but rather the same IP network hardware interface as the gateway 43. The telephony server further includes a controller 45 for controlling the switching function of the various elements 41, 43, 44. The controller 45 also deals with call setup and sends the required messages in the agreed user-to-network protocol, e.g. V5.x or DSS1 to the subscribers 10 hosted by the server 40. The controller 45 incorporates a routing function for dealing with all types of call transmission paths, i.e. calls transmitted entirely within the circuit switched network, calls transmitted between the circuit switched network and the computer network and calls transmitted within the computer network 30.

As mentioned earlier, a number of telephony resources are available in the conventional AXE exchange. These are represented in the telephony server 40 by the block 46. The seizing of these resources for a call is controlled by the controller 45. The resources are then passed on to the call via the switching hardware 41 or circuit switched transmission paths, or the gateway 43 if the call involves a subscriber on the packet switched network 30.

The various elements in the telephony server 40 represented by the switching hardware 41 and the terminals 42 are necessary only for enabling a voice path to be routed through the telephony server to a circuit switched network. If a call is established between two subscribers 10, 20 which are connected to the IP network, these elements will play no part in the communication. The gateway 43 is also utilised for inter-network calls, however, it may also be required for providing a voice path when the telephony resources 46 are located as illustrated at the telephony server 40. It will thus be appreciated by those skilled in the art that these elements need not form part of a telephony server that does not serve as an interface to a circuit switched network and that included no telephony resources.

The network further includes a TNS resolver 46 for handling the interface between the telephony server 40 and the telephone number server 60. It establishes a connection with the telephony number server 60 when the telephony number server 60 is due to be activated. It will preferably also deal with the administration of the IP addresses to the telephony number server 60 such as defining new numbers and updating the telephony number server 60 when subscribers are connected or disconnected. While the administration functions of the TNS resolver 46 are incorporated in the telephony server 40, it will be understood by those skilled in the art that a separate network administration node remote from the telephony server 40 could provide this function.

Figure 3:
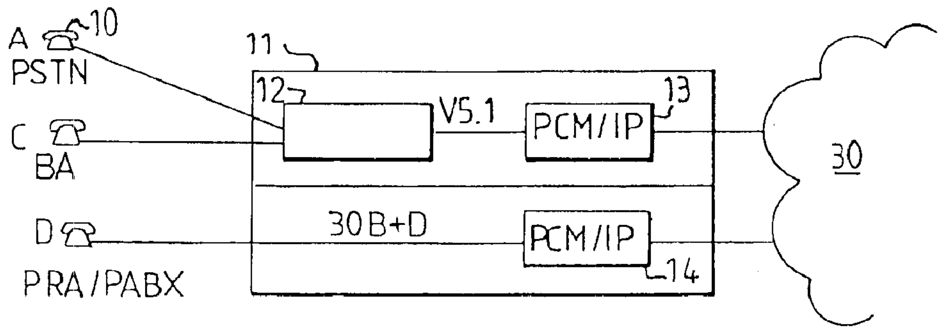
FIG. 3 shows an access node according to the present invention.

The access node 11 is illustrated in FIG. 3. A number of subscribers A, C and D are connected to the access node 11. The subscribers access this node 11 in the traditional circuit switched manner, that is via a two-wire PSTN terminal for subscriber A, an ISDN BA (basic rate access, 2B+D) terminal for subscriber C or an ISDN PRA (primary rate access, 30B+D) terminal for subscriber D which is illustrated as a PABX. The PSTN and ISDN BA terminals are connected to a signalling function 12 which essentially performs the task of a conventional V5.x access node. In this function 12 signalling to or from the two-wire subscriber is collected and relayed into or out of a 64 kbps signalling channel with 2 Mbps pulse code modulation (PCM). A PCM to IP converter 13 is coupled to this signalling function 12 and packs the 64 kbps channel to IP packets and routes these packets to the correct destination in the IP network. This routing is performed under control of the telephony server 40. The PCM to IP converter also performs the inverse conversion and unpacks the IP packets to a 64 kbps bit stream. The primary rate access (PRA) interface is likewise provided with a PCM to IP converter 14 which performs a similar function. While these converters 13, 14 are depicted as separate entities in FIG. 3, it will be understood by those skilled in the art that the same functional block could perform the packing, unpacking and routing functions for both interfaces.

Figure 4:
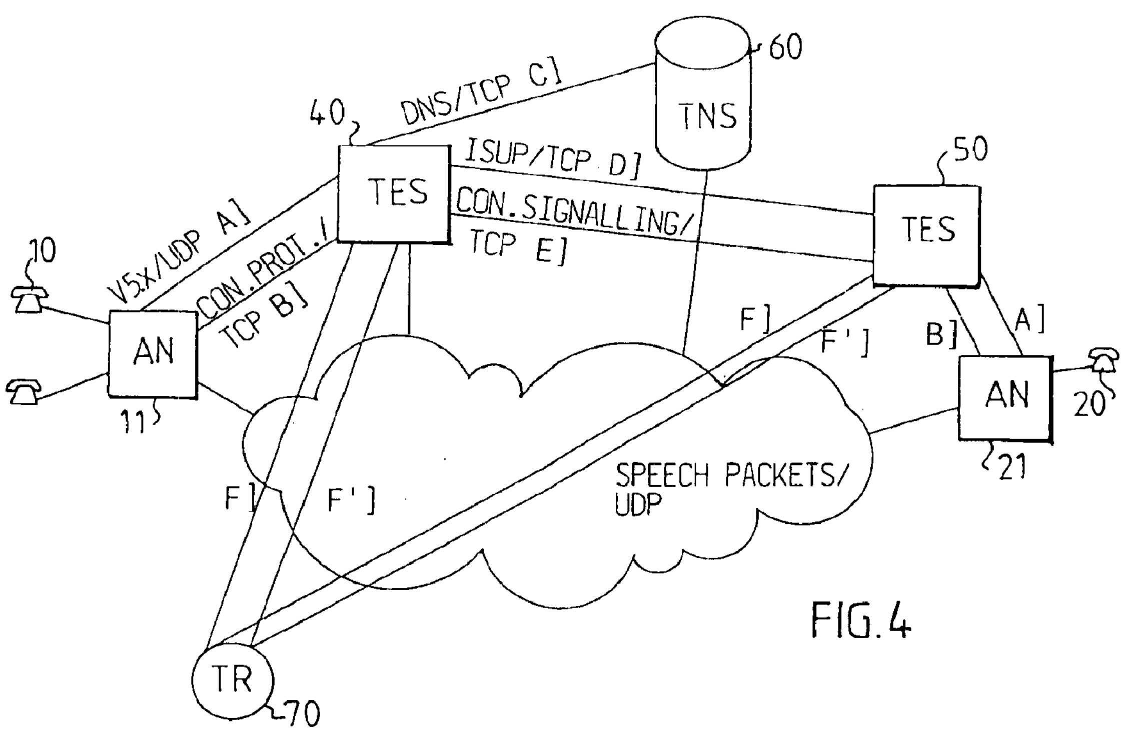
FIG. 4 illustrates the signalling between the various elements of the network in FIG. 1.

The different forms of signalling occurring between the various elements over the computer network 30 are summarised in the schematic of FIG. 4. All protocols are carried on IP. The superimposed protocols are preferably 'standard' or commonly used protocols that allow network elements to be interchanged with equipment from different vendors. The so-called standard protocols are preferably well-established ITU protocols that are readily understood by the counterpart circuit switched network elements. This also allows the various services supported by commonly used protocols to be retained. Accordingly, the signalling between the access node 11 and the telephony server 40 at call setup and for communicating routing information to the access node 11 utilises a tic protocol A] such as V5.x or similar over UDP. For ISDN primary rate access, DSS1 over UDP is utilised. A connection protocol B] is also provided for and would typically be V5.x BCC over TCP. Communication between two telephony servers connected to the IP-based network uses a traffic protocol D], which is typically a SS7 ISUP over TCP. A connection protocol E] is also provided which may be part of ISUP or external to ISUP. The telephony servers 40, 50 communicate with the telephony number server 60 for requesting the destination IP address associated with a particular b-number using a suitable protocol C] which is preferably a DNS protocol over TCP. Finally, two further protocols are provided for communication between a telephony server 40, 50 and telephony resources 70. These include a protocol F] to seize and control resources, and F'] the connection part of F]. F] and F'] do not need to be standard protocols since the telephony resource nodes 70 are effectively new elements that have no counterpart in a circuit switched system. For the actual packet transport IETF protocols are used. The same is true for lower address resolutions and new network elements.

Before calls are allowed over the access node 11, a signalling channel must be established between the signalling function part 12 of the access node 11 or PABX and the host telephony server 40. This is to establish a LAPV5 or LAPD data layer, respectively. An administrative procedure will initiate an order from the telephony server 40 to the PCM to IP converter 13, 14 in question to start sending or receiving IP packets containing information from the 64 kbps signalling channel on the 30B+D or V5.x interface. The PCM to IP converter 13, 14 treats this signalling channel as a pure 64 kbps bitstream, however, it could recognise the LAPV5 or LAPD frame format and send these frames as UDP/IP packets. Obviously, the same handling of the signalling channel must be performed on both sides of the link. Thus the PCM to IP converter in the gateway 41 of the telephony server 40 would operate in the same manner as the converters 13, 14 of the access node 11. Following this procedure, the normal start-up procedures between a V5.1 access node or PABX and host telephony server are performed. The signalling to and from the telephony server 40 would then be transparent to the PCM to IP converters 13, 14.

When a call is to be established or released, the PCM to IP converter 13, 14 will receive further orders from the host telephony server 40 on establishing or releasing paths. Establishing a path means taking the 64 kbps bitstream agreed upon between the telephony server 40 and the PABX or signalling function 12, packing this into UDP/IP packets, or unpacking it out of UDP/IP packets, and routing to the destination designated by the telephony server 40.

If telephony resources 70 are to be utilised in a call initiated by subscriber A to subscriber B these resources must first be seized by the host telephony server 40 utilising the protocol F] described above. Subsequently, the resource function would be routed through to the access network 11 connecting the calling subscriber A. Thus if a tone sender is seized as a resource, 'tone' packets would be sent from the telephony resource node 70 to the subscriber A, while speech packets are exchanged between subscribers A and B during a conversation.

In the case illustrated in FIG. 1, wherein telephony resources are available as part of the telephony server 40, a 'speech path' must be established initially between the access node 11 of a subscriber and the telephony server 40 when the call is set up at digital reception to enable the telephony resources to be made available to the call. This is indicated by the dashed line between the telephony server 40 and the access node 11 in FIG. 1. A similar path would be setup for speech packets if subscriber A were to make or receive a call to or from a subscriber connected to the circuit switched access network 80. In FIG. 1 the UDP/IP speech packets exchanged between subscriber A and subscriber B are similarly indicated by a dashed line across the packet switched network 30.

Figure 5:
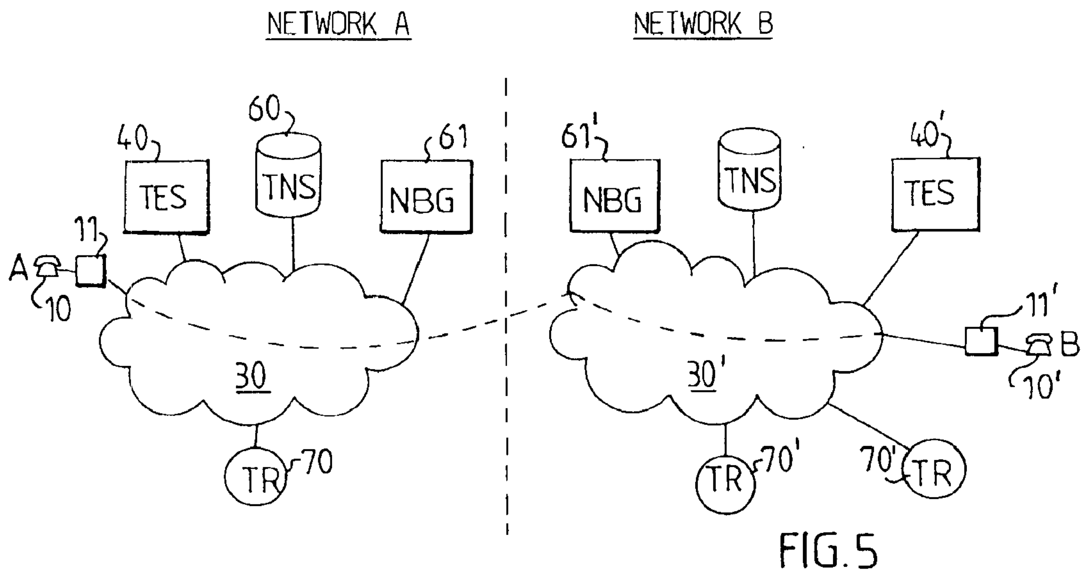
FIG. 5 illustrates the interaction of the network of FIG. 1 with an adjacent packet switched network.

As mentioned above with reference to FIG. 1, the telephony number server 60 contains only the addressing information of end points within the network to which it is connected. If a call is destined for a subscriber connected to a neighbouring network, the telephony number server 60 in the network 30 will not have the destination address. FIG. 5 illustrates the situation when calls traverse two separate IP-based packet switched networks, network A and network B. In FIG. 5, the elements of network B are considered to be the same as those of network A and have been denoted by the same reference numerals modified by a prime symbol. In FIG. 5 IP network border gateways 61, 61' are connected to each computer network 30, 30'. These gateways 61, 61' may be separate elements in the network or they may be part of the associated telephony server 40, 40'. The network border gateways 61, 61' deal with communications between different IF based networks, or IP between IP based networks run by different operators. The manner in which this is done depends on the how operators of adjacent networks agree to work together.

According to a first embodiment of the present invention, each telephony number server 60, 60' in a first network 30 holds the addresses of network border gateways 61, 61' in adjacent networks. When a call from network A is destined for network B, the telephony number server 60 of network A will furnish the telephony server 40 of network A with the IP addresses of the network border gateway 61' to the required terminating or transit network, in this case network B. When the call enters the terminating network through the interconnection point between the networks A and B, the terminating network border gateway 61' would query its telephony number server 60' to determine where to terminate the call. A call between networks thus provokes two queries to telephony number servers 60, 60', namely a query from telephony server 40 to the telephony number server 60 in network A and a query from the network border gateway 61' to the telephony number server 61' in network B.

In a second embodiment according to the present invention, the telephony number server 40 of a network would not contain the addresses of network border gateways 61' in foreign networks but instead holds the addresses of the border gateways 61 in its own network. The telephony number server 60 thus only contains the addresses of the real endpoints to its own network. The network border gateways 61 would then store the addresses of neighbouring networks' border gateways provided by the operators of these networks. All calls between neighbouring networks would then be constrained to go through these network border gateways.

Figure 6:
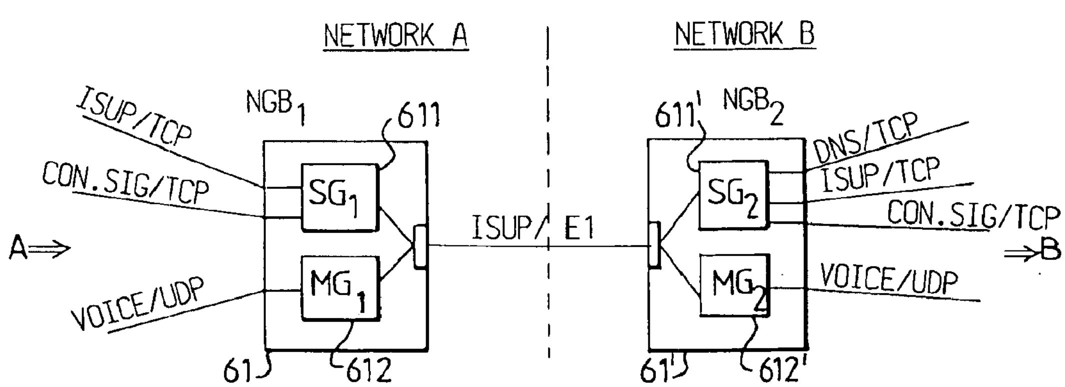
FIG. 6 illustrates a first embodiment of a network element adapted to interact with adjacent networks.
Figure 7:
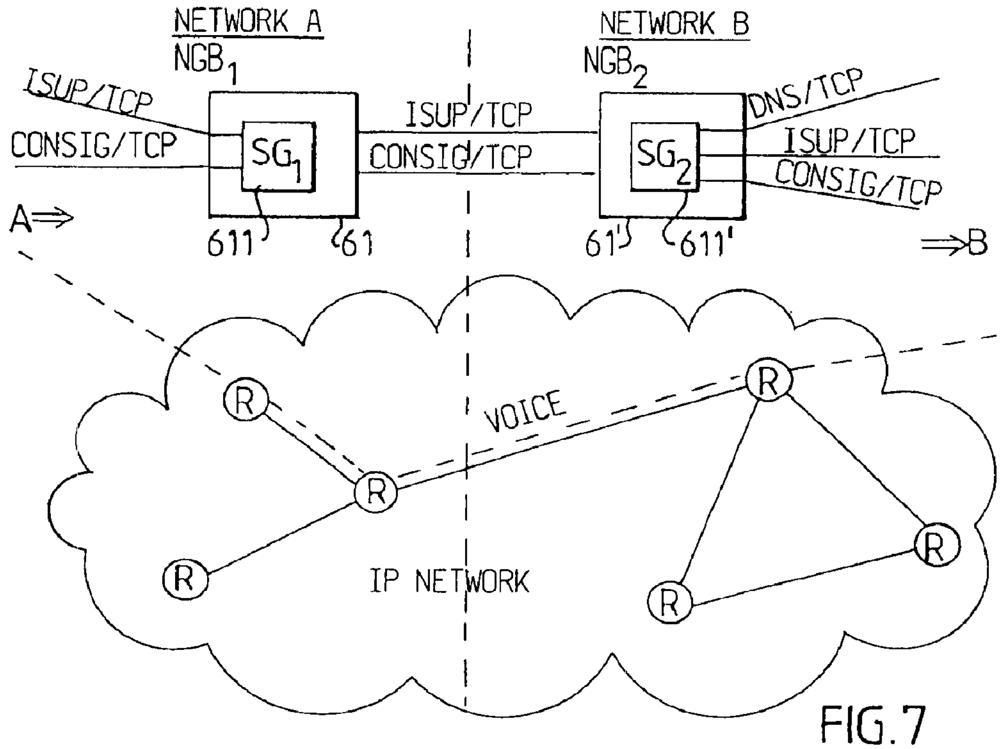
FIG. 7 illustrates a second embodiment of a network element adapted to interact with adjacent networks.
Figure 8:
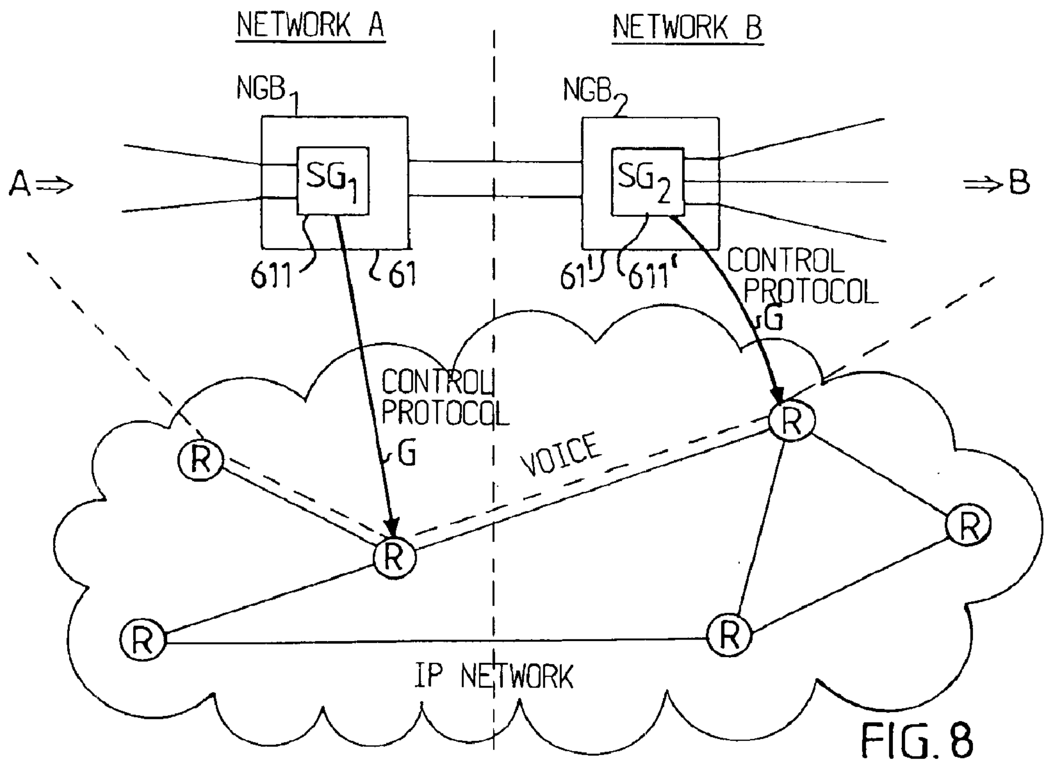
FIG. 8 illustrates a third embodiment of a network element adapted to interact with adjacent networks.

FIGS. 6 to 8 show examples of network border gateways 61, 61' that operate according to the latter embodiment. In these embodiments the network border gateways 61, 61' are separate from the telephony server 40, 40' and are dedicated for both incoming and outgoing calls. Like parts have been denoted by like reference numerals in these three figures.

FIG. 6 shows two network border gateways 61, 61' NGB1 and NGB2 that are linked by a circuit switched interface. A first network border gateway 61 belongs to network A owned by a first operator, the second network border gateway 61' belongs to a network owned by a second operator. The border between the two IP based networks A and B is illustrated by the dashed line. Each network border gateway 61, 61' includes a signalling gateway SG1 611, SG2 611' for exchanging standard telephony protocol messages and a connections signalling protocol CONSIG, and a message gateway MG1 612, MG2 612' for the exchange of voice data. The transition between an IP based format to a circuit switched format increases the delay of the voice stream, however the interface is relatively easy to monitor for statistical functions and policing or the like. The interface between the network border gateways 61, 61' is a standard telephony interface, such as ISUP over E1. The signalling gateway 1 SG1 receives an address for speech from the local telephony server 40 consisting of an IP address and UDP port in the CONSIG protocol. This address points to the A subscriber side and is used by the MG1 to direct voice IP packets originating from subscriber B and received via a timeslot on the circuit switched interface to subscriber A. The address for the voice stream originating from subscriber A to subscriber B is provided by network border gateway NGB 2 61' after it has interrogated its local telephony number server. This is sent to NGB1 61 by the signalling gateway SG2 via the CONSIG protocol. The voice stream from A to B will be sent from A in packets having a destination address of MG1, MG1 unpacks the voice stream and inserts it onto a timeslot. MG2 repacks the voice stream into IP packets with the destination address of B. The reverse process occurs for the voice stream from B to A. In this embodiment, the IP/UDP addresses of the two networks need not be coordinated; the network border gateways NGB1 and NGB2 need only be associated via CIC timeslots on a per call basis.

In the embodiment shown in FIG. 7 the voice steam passes via the IP network as is illustrated by the network of connected routers R. The network border gateways 61, 61' thus do not comprise a message gateway but have only a signalling gateway SG 611. As for the previous embodiment, the signalling gateways 611, 611' exchange ISUP/TCP messages and CONSIG/TCP messages (both over IP) with elements within their own networks. However, these messages are also exchanged in the interface between the network border gateways 61, 61' which is an IP based interface. The CONSIG protocol is not terminated. The CONSIG protocol transports the addresses of A to B and B to A. The voice packets are transferred directly through the IP based network without control by the network border gateways 61, 61'. However, the interface between the two adjacent networks A and B is configured such that and all voice traffic between the operators networks will always go between a designated pair or set of routers. This is illustrated by the solid lines between routers R representing possible paths. In this manner measurements and policing functions may still be performed at these designated routers.

In the third embodiment shown in FIG. 8, the arrangement of the network border gateways 61, 61' is very similar to that shown in FIG. 7 with the exception that the operators of network A and B can impose no physical limitations as to the route which voice traffic will take within the network. The IP based network may even be owned by a separate operator. In order for the operators of the network in which the call originates and term-mates to constrain the voice traffic passes a certain point in the IP network, to enable measurement for example, a router control functionality is incorporated in the network border gateways 61, 61'. The router can be external to the network border gateways 61, 61' as shown in FIG. 8, or integrated in the network border gateway 61, 61' in the manner of the message gateway 612 of FIG. 6. The signalling gateway 611 will then not just pass on the end point addresses in the CONSIG protocol. Instead an address received by the signalling gateway 611 will mapped onto an new address sent (in the manner of a proxy), and a control interface illustrated by the thick line in FIG. 8 and protocol G will order a router to pass a voice stream coming in on one interface out onto another interface.

The arrangement of the telephony number server 60 essentially produces a flat, non-hierarchical structure, wherein neither the IP addresses nor the e.164 numbering plan need be co-ordinated with other network administrations. The only co-ordination required concerns the interconnection points, or network border gateways 6, to other networks. This structure thus utilises the benefits of IP switching and of the more well-structured e.164 numbering plan, where each network administrator is a higher degree of freedom in defining numbering.

The above described arrangement provides a means of bringing an IP-based network closer to the subscriber by replacing the underlying circuit switched transport network with that of an IP-based packet switched network, while retaining the costly elements of a circuit switched network.

What is claimed is:

1. A hybrid telephony server for establishing calls to and from a subscriber connected through an access node to an Internet Protocol (IP)-based network, wherein the server is connected to the IP-based network and a circuit-switched telecommunications network, said server comprising:

an interface with the access node for sending and receiving call setup messages to and from the access node;

an interface with a telephone number/IP address database for obtaining IP addresses corresponding to dialed telephone numbers;

an IP gateway that converts pulse code modulation (PCM) encoded signals to IP packets for transmission over the IP network, and converts IP packets received from the IP network to PCM encoded signals;

an IP switch controller that communicates with and controls media gateways in the IP network;

circuit-switched switching hardware for connecting calls to and from the circuit-switched telecommunications network; and a server controller connected to the interface with the access node, the interface with the telephone number/IP address database, the IP gateway, the IP switch controller, and the circuit-switched switching hardware, wherein the server controller determines from information received from the access node whether each call is an incoming call to the subscriber, an outgoing call from the subscriber, or a call between other parties, and determines whether each call received in the server is destined for the IP-based network or the circuit-switched telecommunications network, wherein, upon determining that a call is an incoming call from the IP-based network to the subscriber, the server controller controls the IP gateway and the IP switch controller to route the call from the IP network to the subscriber, wherein, upon determining that a call is an outgoing call from the subscriber to the IP-based network, the server controller controls the interface with the telephone number/IP address database to convert a dialed telephone number to an IP address for a further party, and controls the IP gateway and the IP switch controller to route the call from the subscriber to the IP network utilizing the converted IP address, wherein, upon determining that a call is an incoming call from the circuit-switched telecommunications network to the subscriber, the server controller controls the interface with the telephone number/IP address database to convert the dialed telephone number of the subscriber to an IP address, and controls the IP gateway and the IP switch controller to route the call from the subscriber through the IP network to the subscriber utilizing the converted IP address, and wherein, upon determining that a call is an outgoing call from the subscriber to the circuit-switched telecommunications network, the server controller controls the IP gateway and the circuit-switched switching hardware to connect the call from the subscriber to the circuit-switched telecommunications network.

2. The hybrid telephony server of claim 1, further comprising at least one telephony resource selected from a group consisting of an answering machine, a conference call device, a tone sender/receiver, a tone detector, a voice mail system, and an echo canceller.

3. The hybrid telephony server of claim 2, wherein the server controller seizes one of the telephony resources when needed for a call, and applies the seized resource to the call utilizing the IP gateway or the circuit-switched switching hardware.

4. A method of utilizing a packet-switched network to switch calls for a circuit-switched telephony server in a circuit-switched telecommunications network, said method comprising the steps of:

modifying the circuit-switched telephony server to create a hybrid telephony server, said modifying step including the steps of:

implementing in the circuit-switched telephony server, an IP gateway that converts pulse code modulation (PCM) encoded signals to IP packets for transmission over the IP network, and converts IP packets received from the IP network to PCM encoded signals;

implementing in the circuit-switched telephony server, an IP switch controller that communicates with and controls media gateways in the IP network;

implementing in the circuit-switched telephony server, circuit-switched switching hardware for connecting calls to and from the circuit-switched telecommunications network; and implementing in the circuit-switched telephony server, a server controller connected to the interface with the access node, the interface with the telephone number/IP address database, the IP gateway, the IP switch controller, and the circuit-switched switching hardware;

connecting the hybrid telephony server to the packet-switched network;

connecting a subscriber to the packet-switched network through an access node;

interfacing the hybrid telephony server with the access node for sending and receiving call setup messages to and from the access node; and interfacing the hybrid telephony server with a telephone number/IP address database for obtaining IP addresses corresponding to dialed telephone numbers;

wherein the server controller determines from information received from the access node whether each call is an incoming call to the subscriber, an outgoing call from the subscriber, or a call between other parties, and determines whether each call received in the server is destined for the IP-based network or the circuit-switched telecommunications network, wherein, upon determining that a call is an incoming call from the IP-based network to the subscriber, the server controller controls the IP gateway and the IP switch controller to route the call from the IP network to the subscriber, wherein, upon determining that a call is an outgoing call from the subscriber to the IP-based network, the server controller controls the interface with the telephone number/IP address database to convert a dialed telephone number to an IP address for a further party, and controls the IP gateway and the IP switch controller to route the call from the subscriber to the IP network utilizing the converted IP address, wherein, upon determining that a call is an incoming call from the circuit-switched telecommunications network to the subscriber, the server controller controls the interface with the telephone number/IP address database to convert the dialed telephone number of the subscriber to an IP address, and controls the IP gateway and the IP switch controller to route the call from the subscriber through the IP network to the subscriber utilizing the converted IP address, and wherein upon determining that a call is an outgoing call from the subscriber to the circuit-switched telecommunications network, the server controller controls the IP gateway and the circuit-switched switching hardware to connect the call from the subscriber to the circuit-switched telecommunications network.

5. The method of claim 4, wherein the telephone number/IP address database provides the IP-based network address of a terminal device in an adjacent network when the further party is not directly or indirectly connected to the IP-based network serving the subscriber.

6. The method of claim 4, wherein the telephone number/IP address database provides the IP-based network address of a terminal device in the same network as the telephone number/IP address database, the method further including interrogating the terminal device to obtain the IP-based network address of the further party.

7. The method of claim 4, further comprising the steps of:

seizing telephony resources coupled to the IP-based network; and establishing a transmission path between the telephony resources and the subscriber.

8. The method of claim 7, wherein the transmission path is a speech path using an IP-based network protocol format.

* * * * *

UNITED STATES PATENT AND TRADEMARK OFFICE

CERTIFICATE OF CORRECTION

| | | |
|---|---|---|
| PATENT NO. | : 6,937,596 B2 | Page 1 of 1 |
| APPLICATION NO. | : 10/742708 | |
| DATED | : August 30, 2005 | |
| INVENTOR(S) | : Sjölund et al. | |

It is certified that error appears in the above-identified patent and that said Letters Patent is hereby corrected as shown below:

In Column 4, Line 19, delete “46” and insert --47 --, therefor.

In Column 4, Line 28, delete “46” and insert -- 47 --, therefor.

In Column 5, Line 5, delete “tic” and insert -- traffic --, therefor.

In Column 6, Line 28, delete “IF” and insert -- IP --, therefor.

In Column 7, Line 64, delete “term-mates” and insert -- terminates --, therefor.

Signed and Sealed this

Twentieth Day of November, 2007

JON W. DUDAS

*Director of the United States Patent and Trademark Office*